(12) United States Patent
Yoo et al.

(10) Patent No.: US 8,815,339 B2
(45) Date of Patent: Aug. 26, 2014

(54) SURFACE MODIFIERS AND PROCESS FOR SURFACE MODIFICATIONS OF PARTICLES OF METAL OXIDE USING THE SAME

(75) Inventors: Bok Ryul Yoo, Seoul (KR); Joon Soo Han, Seongnam-si (KR); Weon Cheol Lim, Seoul (KR); Yong Su Jung, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1559 days.

(21) Appl. No.: 11/966,521

(22) Filed: Dec. 28, 2007

(65) Prior Publication Data

US 2009/0130306 A1 May 21, 2009

(30) Foreign Application Priority Data

Nov. 15, 2007 (KR) .................. 10-2007-0116574

(51) Int. Cl.
*B05D 7/00* (2006.01)
*C09D 7/00* (2006.01)

(52) U.S. Cl.
USPC .................. 427/220; 427/217; 427/219

(58) Field of Classification Search
None
See application file for complete search history.

(56) References Cited

U.S. PATENT DOCUMENTS

2007/0090329 A1* 4/2007 Su et al. .................. 252/387

OTHER PUBLICATIONS

Ishida et al., Midland Macromolecular Monographs (1980), 7 (silylated Surf.), 73-98, Abstract.*

H. Ishida and J. L. Koenig, "New Spectroscopic Techniques for Studying Glass Surfaces,"Midland Macromolecular Monographs (1980), 7(Silylates Surf.), pp. 73-98.*
Ishida et al. (Midland Macromolecular Monographs (1980), 7 (silylated Surf.), 73-98).*
Nolan Tillman, et al. "Formation of Multilayers by Self-Assembly", Langmuir 1989, 5, 101-111.
C.P. Tripp, et al. "Reaction of Alkylchlorosilanes with Silica at the Solid/Gas and Solid/Liquid Interface", Langmuir 1992, 8, 1961-1967.
M.W. Daniels et al. "Silane Adsorption Behavior, Microstructure, and Properties of Glycidoxypropyltrimethoxylane-Modified Colloidal Silica Coatings", Journal of Colloid and Interface Science 1998, 205, 191-200 Article No. CS985671.
C.P. Tripp, et al "Reaction of Chloromethylsilanes with Silica: A Low-Frequency Infrared Study" Langmuir 1991, 7, 923-927.

* cited by examiner

*Primary Examiner* — Yun Qian
(74) *Attorney, Agent, or Firm* — Ladas & Parry LLP

(57) ABSTRACT

Disclosed herein are a surface modifier for metal oxide particles and a method of modifying the surface of metal oxide particles using the same. The surface modifier consists either of an alkylsilanepolyol containing a cyclic alkyl group capable of imparting steric hindrance or of a mixture of said alkylsilanepolyol with alkylalkoxysilane, and the method of modifying the surface of metal oxide particles comprises coating the surface modifier on the hydrophilic surface of the metal oxide particles through chemical bonding so as to impart hydrophobicity or amphiphilicity (hydrophilicity and hydrophobicity) and reactivity to the surface of the metal oxide particles. Through the use of alkylsilane triol having a specific chemical structure, surface-modified metal particles having uniform particle size distribution can be provided not only by inhibiting the condensation and agglomeration of the surface modifier itself during a high-temperature condensation reaction for inducing the chemical bonding between metal oxide and the modifier, but also by stabilizing silicon-hydroxyl (Si—OH) bonds.

17 Claims, 5 Drawing Sheets

(Before surface Treatment)

(After surface Treatment)

(Before surface Treatment)

(After surface Treatment)

(Before surface treatment)

(After surface treatment)

(Before surface treatment)

(After surface treatment)

SURFACE MODIFIERS AND PROCESS FOR SURFACE MODIFICATIONS OF PARTICLES OF METAL OXIDE USING THE SAME

BACKGROUND OF THE INVENTION

1. Field of the Invention

The present invention relates to a surface modifier for metal oxide particles and a method for modifying the surface of metal oxide particles using the same, and more particularly to a surface modifier consisting either an alkylsilanepolyol containing a cyclic alkyl group capable of imparting steric hindrance or a mixture of said alkylsilanepolyol with alkylalkoxysilane, and to a method of modifying the surface of metal oxide particles by coating the surface modifier on the hydrophilic surface of the metal oxide particles through chemical bonding so as to impart hydrophobicity or amphiphilicity (hydrophilicity and hydrophobicity) and reactivity to the surface of the metal oxide particles.

2. Description of the Prior Art

Usually, materials are classified into three categories: organic, inorganic and metal materials.

Currently, in order to improve the fundamental physical properties of each of the different materials, complement the shortcomings, maximize the advantages and realize synergistic effects, different materials are hybridized to form, for example, organic/inorganic composite materials. However, one important consideration in hybridization is the technology for controlling the surface polarity of the different materials. This is because effective dispersion is essential to improve the physical properties of different components through mixing. For this purpose, the development of technologies for hybridizing materials after chemically or electrochemically treating the surface of a substrate, coating the surface or treating the surface with a coupling agent is being actively conducted.

Among materials, inorganic materials receive increasing attention and are used in a wide range of applications, because they have heat resistance, cold resistance, electrical resistance, optical properties, mechanical properties and the like over a wide temperature range compared to other materials and, at the same timer are price competitive. Particularly, because they are porous, and thus have a large internal surface area, they are widely used as adsorbers, packing materials for separation columns, or catalyst carriers.

In addition, inorganic materials such as titanium dioxide ($TiO_2$) or zinc oxide are used as cosmetic materials or electronic materials because they have the ability to block UV light. However, these powders have a shortcoming in that, when they are used in oily cosmetic products or hydrophobic cosmetic products, which do not easily smear due to sweat or water, they will not be effectively dispersed, and thus their properties will not be sufficiently exhibited.

Also, these materials are frequently applied in tire compositions, and the surface modification of silica, which is added as an additive during the manufacture of tires in order to reduce the rolling resistance of tires in response to problems of environmental pollution caused by automobiles, to thus increase the fuel economy and the braking power in water or snow, is of increasing importance. However, inorganic particle silica has a hydroxyl group on the surface thereof, and thus is not easily dispersed in non-polar rubbery composite materials due to the cohesive force thereof. For this reason, to date, a silicone binder, a silica dispersing agent and the like have been separately added to tire tread rubber compositions. However, there are problems in that not only a silane binder, but also a silica dispersing agent, must be separately added, alcohol and water, which are solvents, must be removed after surface treatment, and agglomeration occurs due to the hydrolysis and condensation of the silane binder itself in hydrolysis conditions.

In order to solve a problem in which epoxy molding compounds (EMCs) for protecting semiconductors crack at a temperature higher than 200° C., silica is added to improve the physical properties of EMC. Thus, the effective dispersion of silica which is added in the preparation of EMC is a problem.

As described above, although inorganic oxides are widely used in various applications, it is difficult to use them in combination with other materials due to a problem in which they are not uniformly dispersed in other materials that require hydrophobicity, because the surface thereof consists of a hydroxyl group (—OH), and is thus hydrophilic. Accordingly, there is the need to develop an effective and easy method of modifying the surface of inorganic particles into a hydrophobic surface to allow the particles to be dispersed uniformly, and then inducing chemical bonding.

Methods for rendering the surface of inorganic particles hydrophobic can be diverse depending on the kind of inorganic materials, and methods for the surface modification of inorganic materials that are known to date will now be explained briefly.

In a vapor phase method, low-boiling-point silane with Si—H bond is mainly used, but it has the risk of generating hydrogen gas at high temperature, because it has a silicon-hydrogen (Si—H) bond. In attempts to solve this problem, Korean Patent Laid-Open Publication No. 2004-830 discloses a method of preparing silica directly from a silane-based compound having no silica-hydrogen bond, and Korean Patent Laid-Open Publication No. 2006-128358 discloses a method of modifying a silica surface by heating acrylic silane, and an alkylsilane, having a relatively low boiling point, to a temperature of about 200° C., and spraying the heated materials on the silica surface under pressure. The latter method solves the risk problem, because the silica surface is treated at a relatively low temperature, lower than 200° C., without using a low-boiling-point silane having a silicon-hydrogen bond.

Also, a wet method for increasing dispersion in non-polar rubber composite materials is known. US Patent Publication No. 2005-020323B discloses a wet method of modifying a silica surface to create a hydrophobic surface by dehydrating the silica surface at high temperature, introducing an alkaline earth metal into the end of a hydrophobic polymer, and allowing the polymer to react with the silica. This method is not a method of simply coating the surface of silica, but is a grafting method of inducing covalent bonding, and has an advantage in that the bonds are significantly stable in subsequent processes. However, because an alkaline earth metal such as lithium or sodium is used, impurities remaining after the reaction are likely to reduce bond stability.

As other methods, a method of treating cosmetic particles using, as a surface modifier, a polysilane compound having a fluoroester group was reported (Korean Patent Laid-Open Publication No. 2001-19581). However, this method has shortcomings in that the dispersion of the polysilane compound in pigments is not effective and in that the compound should be used in a larger amount than monomolecular compounds. Also, a method of coating the surface of zinc or a zinc alloy with a trialkoxysilane having a primary alkyl group having 3-5 carbon atoms was reported (Korean Patent Laid-Open Publication No. 2004-59977). However, this method has a problem in that the trialkoxysilane is condensed by itself, because steric hindrance cannot be imparted to the primary alkyl group in a hydrolysis step. In addition, methods of treating the surface of inorganic oxides by self-assembly monolayers (SAMs) of octadecyl chlorosilane, alkyl chlorosilane, glycidoxypropyltrimethoxysilane or the like (Tilman, N., Ulman, A., Penner, T. L. *Langmuir* 1989, 5, 101; Tripp, C. P., Hair, M. L. *Langmuir* 1992, 8, 1961; Daniels, M. W., Francis, L. F., *J. Col. Int. Sci.* 1998, 205).

Although efforts to modify the surface of inorganic materials through various methods as described above have been made, silane compounds used as surface modifiers have been limited mainly to silanes containing a primary alkyl group and tetraalkoxysilanes, and thus there were problems in that unstable silanol groups (Si—OH) are condensed with each other in hydrolysis conditions, or the surface modifier agglomerates before dispersion due to polarity.

SUMMARY OF THE INVENTION

Accordingly, the present inventors have developed a method of modifying the hydrophilic surface of metal oxide into a hydrophobic surface using an alkylsilanepolyol having a specific chemical structure substituted with a cyclic alkyl group as a functional group capable of inhibiting agglomeration or condensation under hydrolysis conditions, thereby completing the present invention.

Therefore, it is an object of the present invention to provide the use of an alkylsilanepolyol, having a specific chemical structure substituted with cyclic saturated or unsaturated alkyl groups, as a surface modifier for metal oxide particles.

Another object of the present invention is to provide a surface modifier for metal oxide particles, which comprises an alkylalkoxysilane compound together with an alkylsilanepolyol, having a specific chemical structure substituted with cyclic saturated or unsaturated alkyl groups and which imparts functionalities such as hydrophobicity or amphiphilicity (hydrophilicity and hydrophobicity) and reactivity.

Still another object of the present invention is to provide a method of imparting hydrophobicity or amphiphilicity (hydrophilicity and hydrophobicity) and reactivity to the hydrophilic surface of metal oxide particles by coating the hydrophilic surface with a surface modifier composed either of an alkylsilanepolyol having a specific chemical structure substituted with cyclic saturated or unsaturated alkyl groups or of a mixture of said alkylsilanepolyol and an alkylalkoxysilane compound, through chemical bonding.

To achieve the above objects, the present invention provides a surface modifier for metal oxide particles, which comprises an alkylsilanepolyol represented by the following formula 1:

RR¹Si(OH)₂         [Formula 1]

wherein R is a cyclic saturated or unsaturated $C_{2-8}$ alkyl group which can be substituted with a hydrogen atom or a $C_{1-6}$ alkyl group, and R¹ is an OH or SiR(OH)₂ group.

In another aspect, the present invention provides a method for modifying the surface of metal oxide particles, the method comprising: dispersing metal oxide powder and said alkylsilanepolyol of the formula 1 in a solvent selected from among water and alcohols having 1 to 6 carbon atoms; evaporating the solvent from the dispersion to obtain metal oxide particles coated with alkylsilanepolyol; and thermally treating the coated metal oxide particles at a temperature of 100-130° C. to obtain metal oxide particles having alkylsilanepolyol chemically bonded to the surface thereof.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
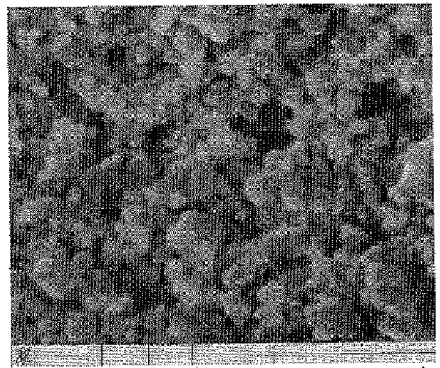
FIG. 1 illustrates electron microscope photographs showing silica particles before surface treatment and silica particles subjected to surface treatment in Example 1.
Figure 1:
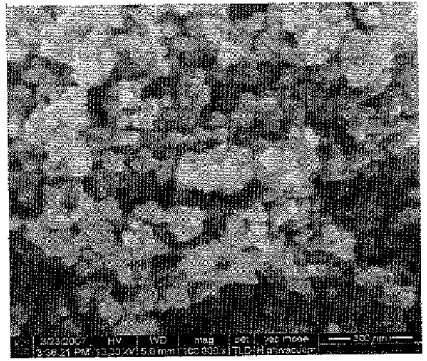

Hereinafter, the present invention will be described in detail.

The present invention is technically characterized in that an organosilane polyol having a specific structure is used instead of an alkoxysilane, which was used as a surface modifier for metal oxide in the prior art. That is, the alkylsilanepolyol represented by formula 1, which is used as a surface modifier for metal oxide in the present invention, is characterized in that it is substituted with a secondary cyclic alkyl group capable of imparting steric hindrance, and thus the secondary alkyl group interferes with the chemical bonding of the alkylsilanepolyol itself to inhibit the agglomeration of the alkylsilanepolyol. Also, it is characterized in that the secondary alkyl group promotes the stabilization of silicon-hydroxyl (Si—OH) bonds to form a surface thin film through hydrogen bonds with the hydrophilic surface of metal oxide particles, and these hydrogen bonds are condensed in a high temperature condensation process to form Si—O-M covalent bonds. Moreover, because the alkylsilanepolyol represented by the formula 1 has high solubility in polar solvents such as water or alcohol, no separate additive for dispersing the alkylsilanepolyol uniformly is used, and the alkylsilanepolyol can form a uniform coating layer by forming covalent bonds via a condensation reaction with metal oxide even through a simple heating process. Particularly, when water is used as solvent, the inventive method can become a very environmentally-friendly surface treatment method. In addition, there is an advantage in that a condensation reaction can be performed in a low-boiling-point solvent without using a vapor phase method.

In the organosilanepolyol represented by the formula 1, R is preferably cyclopentyl, cyclohexanyl, cyclopenten-1-yl, cyclopenten-2-yl, cyclopenten-3-yl, cyclohexen-1-yl, cyclohexen-2-yl, cyclohexen-3-yl, 3-methyl-cyclohexen-3-yl, 4-methyl-cyclohexen-3-yl, or 3,4-dimethyl-cyclohexen-3-yl.

More specific examples of the organosilanepolyol represented by the formula 1, which is used in the present invention, may include cyclopentylsilanetriol, cyclohexanylsilanetriol, cyclopenten-1-ylsilanetriol, cyclopenten-2-ylsilanetriol, cyclopenten-3-ylsilanetriol, cyclohexen-1-ylsilanetriol, cyclohexen-2-ylsilanetriol, cyclohexen-3-ylsilanetriol, 3-methyl-cyclohexen-3-ylsilanetriol, 4-methyl-cyclohexen-3-ylsilanetriol, 3,4-dimethyl-cyclohexen-3-ylsilanetriol, 1,2-dicyclohexyl-1,1,2,2-tetrahydroxydisilane, 1,2-bis(cyclohexen-3-yl)-1,1,2,2-tetrahydroxydisilane, 1,2-bis(3-methyl-cyclohexen-3-yl)-1,1,2,2-tetrahydroxydisilane, 1,2-bis(4-methyl-cyclohexen-3-yl)-1,1,2,2-tetrahydroxydisilane, 1,2-bis(3,4-dimethyl-cyclohexen-3-yl)-1,1,2,2-tetrahydroxydisilane and the like.

The organosilanepolyol represented by formula 1 is used in an amount of 0.01-20 wt %, and preferably 0.1-10 wt %, based on the weight of the metal oxide.

Also, the present invention is characterized in that, in addition to the alkylsilanepolyol represented by formula 1, an alkylalkoxysilane represented by the following formula 2 is used as a surface modifier for metal oxide particles to impart hydrophobicity and reactivity to the surface of the metal oxide particles:

R³Si(OR²)₃      [Formula 2]

wherein R² is a C₁₋₆ alkyl group; and R³ is 3-(glycidoxy)propyl, 2-(3,4-epoxycyclohexyl)ethyl, 3,3,3-trifluoropropyl, 3-[3-(triethoxysilyl)propyltetrathio]propyl, 3-[3-(trimethoxysilyl)propyltetrathio]propyl, 3-[3-(triethoxysilyl)propyldithio]propyl, 3-[3-(trimethoxysilyl)propyldithio]propyl, 3-aminopropyl, N-(2-aminoethyl)-3-aminopropyl, 3-acryloxypropyl, 3-methacryloxypropyl, 2-cyanoethyl, 3-cyanopropyl, 3-isocyanatopropyl, 3-mercaptopropyl, 3-(methacryloxy)propyl, CF₃(CF₂)ₙCH₂CH₂, wherein n is an integer from 0 to 10, 2-(3-hexenyl)ethyl, or a terminal alkenyl group.

The alkylalkoxysilane represented by formula 2 may be included as a surface modifier to impart functionalities, such as hydrophobicity, amphiphilicity (hydrophilicity and hydrophobicity) and reactivity, to the surface of the metal oxide particles. Specific examples of the alkylalkoxysilane represented by the formula 2 may include 3-glycidoxypropyltriethoxysilane, 3-glycidoxypropyltrimethoxysilane, 2-(3,4-epoxycyclohexyl)ethyltriethoxysilane, 2-(3,4-epoxycyclohexyl)ethyltrimethoxysilane, 3,3,3-trifluoropropyltriethoxysilane, 3,3,3-trifluoropropyltrimethoxysilane, bis(3-triethoxysilylpropryl)tetrasulfide, bis(3-trimethoxysilylpropryl)tetrasulfide, bis(3-triethoxysilylpropryl)disulfide, bis(3-trimethoxysilylpropryl)disulfide, 3 aminopropyltriethoxysilane, 3-aminopropyltrimethoxysilane, N-(2-aminoethyl)-3-aminopropyltrimethoxysilane, N-(2-aminoethyl)-3-aminopropyltriethoxysilane, 3-acryloxypropyltrimethoxysilane, 3-acryloxypropyltriethoxysilane, 3-(methacryloxy)propyltriethoxysilane, 3-(methacryloxy)propyltrimethoxysilane, 2-cyanoethyltriethoxsilane, 2-cyanoethyltrimethoxysilane, 3-cyanopropyltriethoxysilane, 3-cyanopropyltrimethoxysilane, 3-isocyanatopropyltriethoxysilane, 3-isocyanatopropyltrimethoxysilane, 3-mercaptopropyltriethoxysilane, 3-mercaptopropyltrimethoxysilane, CF₃(CF₂)ₙCH₂CH₂—Si(OCH₂CH₃)₃ wherein n is an integer ranging from to 10, and preferably from 0 to 4, CF₃(CF₂)ₙCH₂CH₂—Si(OCH₂)₃ wherein n is an integer ranging from 0 to 10, and preferably from 0 to 4, 2-(3-hexenyl)ethyltriethoxysilane, 2-(3-hexenyl)ethyltrimethoxysilane, ethoxysilane having a terminal alkenyl group, and the like.

The alkylalkoxysilane represented by the formula 2 is used in an amount of less than 20 wt %, and preferably 0.1-10 wt %, based on the weight of metal oxide.

Also, the surface modifier of the present invention may additionally contain an aqueous acetic acid solution as a catalyst. When the aqueous acetic acid solution has an acetic acid concentration of 1 wt %, it is preferably used in an amount of 1-5 wt % based on the weight of the metal oxide.

Meanwhile, the scope of the present invention encompasses a method of modifying the surface of the metal oxide particles using the above-described surface modifier.

The surface modification method according to the present invention comprises the steps of:

i) uniformly dispersing metal oxide powder and alkylsilanepolyol, represented by the formula 1, in a solvent selected from among water and alcohols having 1 to 6 carbon atoms;
ii) dispersing the solvent from the dispersion to obtain metal oxide particles coated with alkylsilanepolyol; and (iii) drying and condensing the coated metal oxide particles at a temperature of 100-130° C. to obtain metal oxide particles having alkylsilanepolyol chemically bonded to the surface thereof.

In the surface modification method according to the present invention, the alkylalkoxysilane represented by the formula 2, in addition to the alkylsilanepolyol represented by the formula 1, may be included in the solvent to impart various functionalities to the surface of metal oxide particles.

Metal oxides, to which the surface modifier according to the present invention is applied, are in a powder state in which a mean particle size ranges from 5 nm to 100 μm. These metal oxides are inorganic materials which are frequently used as fillers in the art, and examples thereof may include wet or dry silica, mica, talc, titanium oxide, zirconium oxide, tin oxide, iron oxide, zinc oxide and the like. This surface modifier of the present invention can also be applied using a method for modifying the surface of a substrate such as a silicon wafer.

Each step of the surface modification method according to the present invention will now be described in further detail.

The step i) is a process of uniformly dispersing metal oxide powder and the surface modifier. The metal oxide powder is used after it is dried and dehydrated using, for example, a dryer. As the surface modifier, the alkylsilanepolyol represented by the formula 1 is used alone or in combination with the alkylalkoxysilane represented by the formula 2. For uniform dispersion of the metal oxide powder and the surface modifier, a solvent selected from among water and alcohol having 1 to 6 carbon atoms is used in the present invention. In this case, uniform dispersion can be achieved, because the silane compound represented by the formula 1 or 2, which is used as the surface modifier in the present invention, has high solubility in water and alcohol solvents.

If necessary, an aqueous acetic acid solution may also be added as a catalyst. When the aqueous acetic acid solution has an acetic acid concentration of 1 wt %, it is preferably added in an amount of 1-5 wt % based on the weight of the metal oxide powder.

The step ii) is a process of obtaining metal oxide particles coated with alkylsilanepolyol. That is, the solvent is removed from the above-prepared dispersion using a rotary evaporator to obtain metal oxide particles coated with alkylsilanepolyol. Herein, the organosilane polyol forms hydrogen bonds with the hydroxyl groups on the surface of the metal oxide particles, or is adsorbed on the surface thereof depending to the polarity thereof.

The step iii) is a process of thermally treating the coated metal oxide particles obtained in the above step such that the alkylsilanepolyol coated on the surface of the particles forms a thin film on the metal oxide particles through, for example, chemical covalent bonds. The thermal treatment is carried out at a temperature of 100-130° C.

Hereinafter, the present invention will be described in further detail with reference to the following examples, but the scope of the present invention is not limited to these examples.

EXAMPLES

Example 1

Treatment of Silica (SiO₂) Surface with Cyclopentenylsilanetriol

In a 250-ml round bottom flask, 10 g of wet silica selected from among 150 m²/g Aerosil® (Degussa, 15 nm, 140-80

$m^2/g$, Aldrich, 99.5%), 175 $m^2/g$ ZEOSIL® 175GR and 115 $m^2/g$ ZEOSIL® 115GR (Rodia) was stirred and dispersed in 50 ml of water. To the dispersion, a solution of 1.0 g of cyclopentenylsilanetriol dissolved in water was added dropwise over 10 minutes and stirred. Water was removed from the dispersion to the greatest possible extent using a rotary evaporator, and the remaining material was dried in a vacuum oven at 130° C. for 6 hours. In order to examine the state of the silica particles before and after treatment, the silica particles were analyzed with an electron microscope, and the analysis results are shown in FIG. 1.

Figure 2:
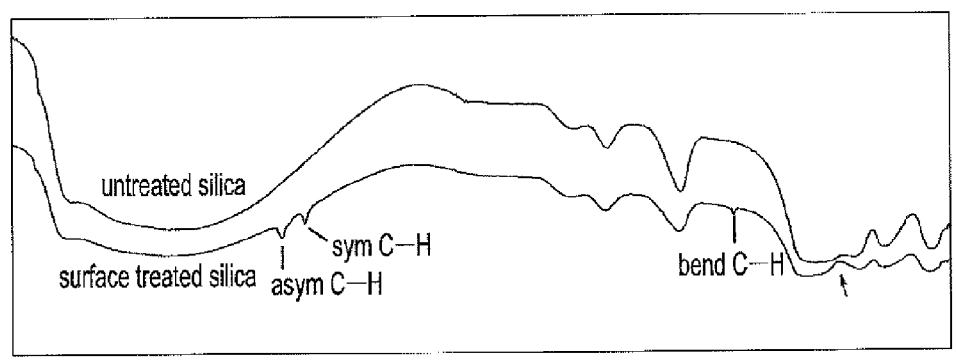
FIG. 2 shows the results of infrared spectrometry for silica particles subjected to surface treatment in Example 1.

Also, the surface-treated silica was analyzed by infrared spectrometry using DRIFT (diffuse reflectance FR-IR) as an infrared spectrometer and MCT (mercury-cadmium-telluride) as a detector. The results of the infrared spectrometry are shown in FIG. 2. As can be seen in FIG. 2, characteristic absorption peaks were observed at 2929 $cm^{-1}$ (asym, C—H stretching), 2857 $cm^{-1}$ (sym, C—H stretching) and 1457 $cm^{-1}$ (C—H bend). For reference, negative broad bands appearing between 1150 $cm^{-1}$ and 1050 $cm^{-1}$ were considered to be attributable to S is —O—Si [Hair, M. L., Tripp, C. P., Langmuir, 1991, 7, 923].

Figure 3:
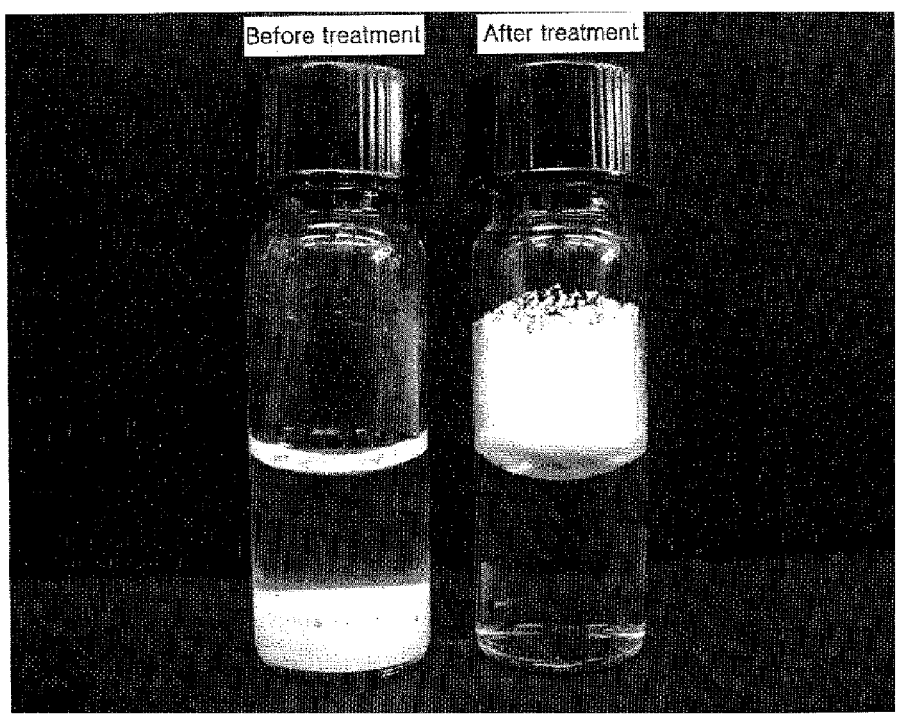
FIG. 3 shows the comparison between silica particles before surface treatment and silica particles subjected to surface treatment in Example 1.

The silica particles before surface treatment and the silica particles after surface treatment were compared with each other after they were shaken in water and then left to stand for 1 hour. As can be seen from the photographs in FIG. 3, the silica particles before surface treatment settled down within a few minutes, and the silica particles after surface treatment floated in the water, because they were modified into hydrophobic particles.

Example 2

Treatment of Silica ($SiO_2$) Surface with Cyclopentenylsilanetriol

In a flask, 10 g of the same wet silica (dried at 120° C. for 8 hours) as used in Example 1 was stirred and dispersed in 50 ml of methanol. Then, a solution of 1.0 g of cyclopentenylsilanetriol dissolved in methanol at 0° C. was added dropwise to the flask at 0° C. and stirred for 10 minutes. The solvent was removed to the greatest possible extent using a rotary evaporator, and the remaining material was dried in a vacuum oven at 130° C. for 6 hours.

Example 3

Treatment of Silica ($SiO_2$) Surface with Cyclopentenylsilanetriol and bis(3-triethoxysilylpropyl)tetrasulfide In a flask, 10 g of the same wet silica (dried at 120° C. for 8 hours) as used in Example 1 was dispersed in 50 ml of methanol. Then, 0.5 g of cyclopentenylsilanetriol and 0.5 g of bis(3-triethoxysilylpropyl)tetrasulfide (Degussa Germany, Si69) were added dropwise to the flask and stirred for 10 minutes. The solvent was removed to the greatest possible extent using a rotary evaporator, and the remaining material was dried in a vacuum oven at 130° C. for 6 hours. In this Example, 1 ml of 1 wt % acetic acid aqueous solution as a catalyst was added dropwise to the dispersion and, as a result, the surface modification of the metal oxide was more effectively conducted.

Example 4

Treatment of Silica ($SiO_2$) Surface with Cyclopentenylsilanetriol and 3-mercaptopropyltriethoxysilane In a flask, 10 g of the same wet silica (dried at 120° C. for 8 hours) as used in Example 1 was dispersed in 50 ml of methanol. Then, 0.5 g of cyclopentenylsilanetriol and 0.5 g of 3-mercaptopropyltriethoxysilane (Gelest, Inc.) were added dropwise to the flask and stirred for 10 minutes. The solvent was removed to the greatest possible extent using a rotary evaporator, and the remaining material was dried in a vacuum oven at 130° C. for 6 hours.

Example 5

Treatment of Silica ($SiO_2$) Surface with cyclopentenylsilanetriol and 3-(glycidoxy)propyltriethoxysilane 10 g of the same wet silica (dried at 120° C. for 8 hours) as used in Example 1, 50 ml of methanol, 0.5 g of cyclopentenylsilanetriol and 0.5 g of 3-(glycidoxy)propyltriethoxysilane were added dropwise to a flask and stirred for 10 minutes. The solvent was removed to the greatest possible extent using a rotary evaporator, and the remaining material was dried in a vacuum oven at 130° C. for one day. In this Example, 1 ml of 1 wt % acetic acid aqueous solution as a catalyst was added dropwise to the dispersion and, as a result, the surface modification of the metal oxide was more effectively conducted.

Example 6

Treatment of Silica ($SiO_2$) Surface with Cyclopentenylsilanetriol and 2-(3,4-epoxycyclohexyl)ethyltriethoxysilane 10 g of the same wet silica (dried at 120° C. for 8 hours) as used in Example 1, 50 ml of methanol, 0.50 g of cyclopentenylsilanetriol and 0.50 g of 2-(3,4-epoxycyclohexyl)ethyltriethoxysilane were added dropwise to a flask and stirred for 10 minutes. The solvent was removed to the greatest possible extent using a rotary evaporator, and the remaining material was dried in a vacuum oven at 130° C. for one day. In this Example, 1 ml of 1 wt % acetic acid aqueous solution as a catalyst was added dropwise to the dispersion and, as a result, the surface modification of the metal oxide was more effectively conducted.

Example 7

Treatment of Silica ($SiO_2$)— Surface with Cyclopentenylsilanetriol and 3-(methacryloxy)propyltriethoxysilane 10 g of the same wet silica (dried at 120° C. for 8 hours) as used in Example 1, 50 ml of methanol, 0.50 g of cyclopentenylsilanetriol and 0.50 g of 3-(methacryloxy)propyltriethoxysilane were added dropwise to a flask and stirred for 10 minutes. The solvent was removed to the greatest possible extent using a rotary evaporator, and the remaining material was dried in a vacuum oven at 130° C. for one day.

Example 8

Treatment of Silica ($SiO_2$) Surface with Cyclopentenylsilanetriol and 3-isocyanatopropyltrimethoxysilane 10 g of the same wet silica (dried at 120° C. for 8 hours) as used in Example 1, 50 ml of methanol, 0.50 g of cyclopentenylsilanetriol and 0.50 g of 3-isocyanatopropyltrimethoxysilane were added dropwise to a flask and stirred for 10 minutes. The solvent was removed to the greatest possible extent using a rotary evaporator, and the remaining material was dried in a vacuum oven at 130° C. for one day.

Example 9

Treatment of Silica ($SiO_2$) Surface with Cyclopentenylsilanetriol and 3-isocyanatopropyltriethoxysilane 10 g of the same wet silica (dried at 120° C. for 8 hours) as used in Example 1, 50 ml of methanol, 0.50 g of cyclopentenylsilanetriol and 0.50 g of 3-isocyanatopropyltriethoxysilane were added dropwise to a flask and stirred for 10 minutes. The solvent was removed to the greatest possible extent using a rotary evaporator, and the remaining material was dried in a vacuum oven at 130° C. for one day.

Example 10

Treatment of Silica ($SiO_2$) Surface with Cyclopentenylsilanetriol and 3-aminopropyltriethoxysilane 10 g of the same wet silica (dried at 120° C. for 8 hours) as used in Example 1, 50 ml of methanol, 0.50 g of cyclopentenylsilanetriol and 0.50 g of 3-aminopropyltriethoxysilane were added dropwise to a flask and stirred for 10 minutes. The solvent was removed to the greatest possible extent using a rotary evaporator, and the remaining material was dried in a vacuum oven at 130° C. for one day.

Example 11

Treatment of Silica ($SiO_2$) Surface with Cyclopentenylsilanetriol and $CF_3(CF_2)_nCH_2CH_2$—Si$(OCH_2CH_3)_3$ (n=0)

10 g of the same wet silica (dried at 120° C. for 8 hours) as used in Example 1, 50 ml of methanol, 0.50 g of cyclopentenylsilanetriol and 0.50 g of $CF_3(CF_2)_nCH_2CH_2$—Si$(OCH_2CH_3)_3$ (n=0) were added dropwise to a flask and stirred for 10 minutes. The solvent was removed to the greatest possible extent using a rotary evaporator, and the remaining material was dried in a vacuum oven at 130° C. for one day. In this Example, 1 ml of 1 wt % acetic acid aqueous solution as a catalyst was added dropwise to the dispersion and, as a result, the surface modification of the metal oxide was more effectively conducted.

Example 12

Treatment of Silica ($SiO_2$) Surface with Cyclopentenylsilanetriol and 2-(3-hexenyl)ethyltriethoxysilane 10 g of the same wet silica (dried at 120° C. for 8 hours) as used in Example 1, 50 ml of methanol, 0.50 g of cyclopentenylsilanetriol and 0.50 g of 2-(3 hexenyl)ethyltriethoxysilane were added dropwise to a flask and stirred for 10 minutes. The solvent was removed to the greatest possible extent using a rotary evaporator, and the remaining material was dried in a vacuum oven at 130° C. for one day. In this Example, 1 ml of 1 wt % acetic acid aqueous solution as a catalyst was added dropwise to the dispersion and, as a result, the surface modification of the metal oxide was more effectively conducted.

Example 13

Figure 4:
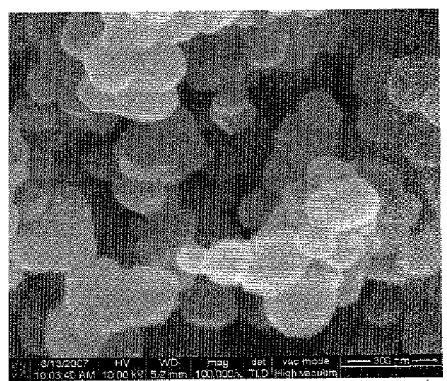
FIG. 4 illustrates electron microscope photographs showing titanium dioxide particles before surface treatment and titanium dioxide particles subjected to surface treatment in Example 13.
Figure 4:
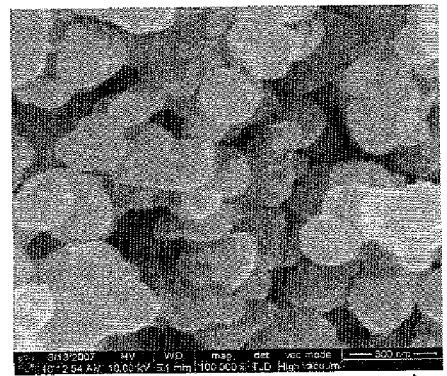

Treatment of Titanium Dioxide ($TiO_2$) Surface with Cyclopentenylsilanetriol 10 g of titanium dioxide (Aldrich, 99.8%) was treated with 1.0 g of cyclopentenylsilanetriol according to the same method described in Example 2. The titanium dioxide particles before and after surface treatment were observed under an electron microscope, and the observation results are shown in FIG. 4.

Example 14

Figure 5:
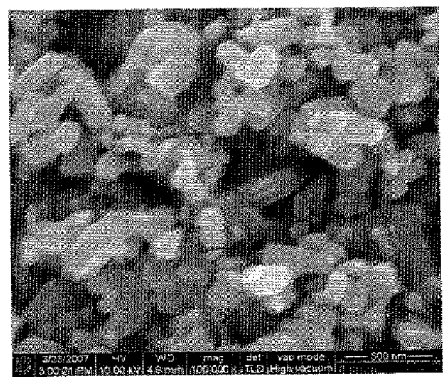
FIG. 5 illustrates electron microscope photographs showing zirconium dioxide particles before surface treatment and zirconium dioxide particles subjected to surface treatment in Example 14.
Figure 5:
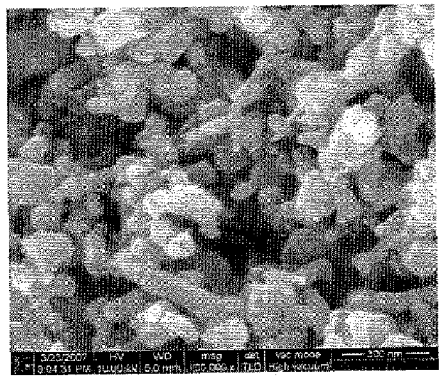

Treatment of Zirconium Dioxide ($ZrO_2$) Surface with Cyclopentenylsilanetriol 10 g of zirconium dioxide (sigma-Aldrich, 1 μm, 99%) was treated with 1.0 g of cyclopentenylsilanetriol according to the same method described in Example 2. The zirconium dioxide particles before and after surface treatment were observed with an electron microscope, and the observation results are shown in FIG. 5.

Example 15

Treatment of Zirconia ($ZrO_2$) Surface with Cyclopentylsilanetriol 10 g of zirconium dioxide (Sigma-Aldrich, 1 μm, 99%) was treated with 1.0 g of cyclopentenylsilanetriol according to the same method described in Example 2, thus preparing surface-modified zirconia.

Example 16

Treatment of Silica ($SiO_2$) Surface with Cyclopentylsilanetriol

The same silica as used in Example 1 was treated cyclopentylsilanetriol instead of cyclopentenylsilanetriol in the same manner as described in Example 1. The results obtained in this Example were similar to those in Example 1.

Example 17

Treatment of Silica ($SiO_2$) Surface with Cyclopentylsilanetriol 10 g of the same silica used in Example 1 was added to an aqueous solution of 1.0 g of cyclopentylsilanetriol, prepared by hydrolyzing cyclopentyl trimethoxysilane according to the method of Korean Patent Application No 2007-106843, filed in the name of the present applicant. The mixture was stirred, while water and methanol (hydrolysis product) were evaporated therefrom. The remaining material was dried in a vacuum oven at 130° C. for one day. All of the treated silica particles were observed to float in water, because they had been modified into hydrophobic particles.

Example 18

Treatment of Silica ($SiO_2$) Surface with Cyclohexanylsilanetriol

The same wet silica used in Example 1 was treated with a solution of cyclohexanylsilanetriol dispersed in methanol, according to the same method described in Example 2. All of the treated silica particles were observed to float in water, because they had been modified into hydrophobic particles.

Example 19

Treatment of Silica ($SiO_2$) Surface with 3-methyl-3-cyclohexenylsilanetriol

The same wet silica used in Example 1 was treated with a solution of 3-methyl-3-cyclohexenylsilanetriol dispersed in methanol, according to the same method as described in Example 2. All of the treated silica particles were observed to float in water, because they had been modified into hydrophobic particles.

Example 20

Treatment of Silica ($SiO_2$) Surface with 4-methyl-3-cyclohexenylsilanetriol

The same wet silica used in Example 1 was treated with a solution of 4-methyl-3-cyclohexenylsilanetriol dispersed in methanol, according to the same method as described in Example 2. All of the treated silica particles were observed to float in water, because they had been modified into hydrophobic particles.

Example 21

Treatment of silica ($SiO_2$) surface with 3,4-dimethyl-3-cyclohexenylsilanetriol The same wet silica used in Example 1 was treated with a solution of 3,4-dimethyl-3-cyclohexenylsilanetriol dispersed in methanol, according to the same method as described in Example 2. All of the treated silica particles were observed to float in water, because they had been modified into hydrophobic particles.

Example 22

Treatment of Silica ($SiO_2$) Surface with 1,2-dicyclohexyl-1,1,2,2-tetrahydroxydisilane The same wet silica used in Example 1 was treated with a solution of 1,2-dicyclohexyl-1,1,2,2-tetrahydroxydisilane dispersed in methanol, according to the same method as described in Example 2. All of the treated silica particles were observed to float in water, because they had been modified into hydrophobic particles.

Example 23

Treatment of Silica ($SiO_2$) Surface with 1,2-bis(cyclohexen-3-yl)-1,1,2,2-tetrahydroxydisilane The same wet silica used in Example 1 was treated with a solution of 1,2-bis(cyclohexen-3-yl)-1,1,2,2-tetrahydroxydisilane dispersed in methanol, according to the same method as described in Example 2. All of the treated silica particles were observed to float in water, because they had been modified into hydrophobic particles.

Example 24

Treatment of Silica ($SiO_2$) Surface with Mixture of Cyclopentylsilanetriol and 1,2-dicyclopentyl-1,1,2,2-tetrahydroxydisilane Cyclopentylsilanetriol, obtained by hydrolyzing cyclopentyl trimethoxysilane, was mixed with 1,2-dicyclopentyl-1,1,2,2-tetrahydroxydisilane at a molar ratio of 1:4. 10 g of the same silica used in Example 1 was added to 1.0 g of the mixture and stirred, while water and methanol (hydrolysis product) were evaporated therefrom. The remaining material was dried in a vacuum oven at 130° C. for one day. All of treated silica particles were observed to float in water, because they had been modified into hydrophobic particles.

Example 25

Treatment of Silica ($SiO_2$) Surface with Aqueous Solution of Cyclopentenylsilanetriol In a flask, 10 g of the same wet silica (11 nm, 225 $m^2/g$, Aldrich) used in Example 2 was stirred and dispersed in 50 ml of methanol. Then, 3.0 g of cyclopentenylsilanetriol dispersed in methanol at 0.0° C. was added dropwise to the flask at 0° C. and stirred for 10 minutes. The solvent was removed to the greatest possible extent using a rotary evaporator, and the remaining material was dried in a vacuum oven at 130° C. for 6 hours. All of the treated silica particles were observed to float in water, because they had been modified into hydrophobic particles.

Example 25

Treatment of Silica ($SiO_2$) Surface with Hydrolysate of (2-cyclopentenyl)trimethoxysilane At atmospheric pressure and room temperature, 0.65 ml of 1 wt % acetic acid aqueous solution was placed in a 50-ml glass flask, and 0.65 ml of (2-cyclopentenyl)trimethoxysilane was added thereto with stirring. After hydrolysis at 25° C. for 1 hour, the solution became completely clear (complete conversion to silanetriol). Then, the solution and 10 g of the same silica used in Example 1 were stirred and dispersed in 50 ml of methanol. Then, the solvent was removed to the greatest possible extent using a rotary evaporator, and the remaining material was dried in a vacuum oven at 130° C. for 6 hours. The results obtained in this Example were similar to those in Example 2.

As described above, according to the present invention, the surface of nanometer-sized, functional metal oxide can be modified using, as a modifier, an organosilane polyol substituted with a specific functional group imparting steric hindrance. The surface-modified functional metal oxide particles can be widely used to, for example, impart functionality to various organic composites and improve the performance of the composites.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A surface modifier for metal oxide particles comprising: an organotetrahydroxydisilane represented by the following formula 1:

$$RR^1Si(OH)_2 \quad \text{[Formula 1]}$$

wherein R is selected from among cyclopentyl, cyclohexanyl, cyclopenten-1-yl, cyclopenten-2-yl, cyclopenten-3-yl, cyclohexen-1-yl, cyclohexen-2-yl, cyclohexen-3-yl, 3-methyl-cyclohexen-3-yl, 4-methyl-cyclohexen-3-yl, and 3,4-dimethylcyclohexen-3-yl, and $R^1$ is an SiR(OH)$_2$ group.

2. The surface modifier of claim 1 further comprising an organosilanetriol selected from among cyclopentylsilanetriol, cyclohexanylsilanetriol, cyclopenten-1-ylsilanetriol, cyclopenten-2-ylsilanetriol, cyclopenten-3-ylsilanetriol, cyclohexen-1-ylsilanetriol, cyclohexen-2-ylsilanetriol, cyclohexen-3-ylsilanetriol, 3-methyl-cyclohexen-3-ylsilanetriol, 4-methyl-cyclohexen-3-ylsilanetriol, and 3,4-dimethyl-cyclohexen-3-ylsilanetriol.

3. The surface modifier of claim 2, which additionally comprises an organoalkoxysilane represented by the following formula 2:

$$R^3Si(OR^2)_3 \quad \text{[Formula 2]}$$

wherein $R^2$ is a $C_{1-6}$ alkyl group; and $R^3$ is 3-(glycidoxy)propyl, 2-(3,4-epoxycyclohexyl)ethyl, 3,3,3-trifluoropropyl, 3-[3-(triethoxysilyl)propyltetrathio]propyl, 3-[3(trimethoxysilyl)propyltetrathio]propyl, 3-[3-(triethoxysilyl)propyldithio]propyl, 3-[3-(trimethoxysilyl)propyldithio]propyl, 3-aminopropyl, N-(2-aminoethyl)-3-aminopropyl, 3-acryloxypropyl, 3-methacryloxypropyl, 2-cyanoethyl, 3-cyanopropyl, 3-isocyanatopropyl, 3-mercaptopropyl, 3-(methacryloxy)propyl, $CF_3(CF_2)_nCH_2CH_2$, wherein n is an integer from 0 to 10, 2-(3-hexenyl)ethyl, or a terminal alkenyl group.

4. The surface modifier of claim 3, wherein the organoalkoxysilane represented by the formula 2 is selected from 3-glycidoxypropyltriethoxysilane, 3-glycidoxypropyltrimethoxysilane, 2-(3,4-epoxycyclohexyl)ethyltriethoxysilane, 2-(3,4-epoxycyclohexyl)ethyltrimethoxysilane, 3,3-trifluoropropyltriethoxysilane, 3,3,3-trifluoropropyltrimethoxysilane, 3-aminopropyltriethoxysilane, 3-aminopropyltrimethoxysilane, N-(2-aminoethyl)-3-aminopropyltrimethoxysilane, N-(2-aminoethyl)-3-aminopropyltriethoxysilane, 3-acryloxypropyltrimethoxysilane, 3-acryloxypropyltriethoxysilane, 3-(methacryloxy)propyltriethoxysilane, 3-(methacryloxy)propyltrimethoxysilane, 2-cyanoethyltriethoxysilane, 2-cyanoethyltrimethoxysilane, 3-cyanopropyltriethoxysilane, 3-cyanopropyltrimethoxysilane, 3-isocyanatopropyltriethoxysilane, 3-isocyanatopropyltrimethoxysilane, 3-mercaptopropyltriethoxysilane, 3-mercaptopropyltrimethoxysilane, $CF_3(CF_2)_nCH_2CH_2$—$Si(OCH_2CH_3)_3$, $CF_3(CF_2)_nCH_2CH_2$—$Si(OCH_3)_3$, 2-(3-hexenyl)ethyltriethoxysilane, and 2-(3-hexenyl)ethyltrimethoxysilane.

5. The surface modifier of claim 3 further comprising an aqueous acetic acid solution.

6. The surface modifier of claim 1, wherein the organotetrahydroxydisilane represented by formula 1 is selected from the group consisting of 1,2-dicyclohexyl-1,1,2,2-tetrahydroxydisilane, 1,2-bis(cyclohexen-3-yl)-1,1,2,2-tetrahydroxydisilane, 1,2-bis(3-methyl-cyclohexen-3-yl)-1,1,2,2-tetrahydroxydisilane, 1,2-bis(4-methyl-cyclohexen-3-yl)1,1,2,2-tetrahydroxydisilane, and 1,2-bis(3,4-dimethylcyclohexen-3-yl)-1,1,2,2-tetrahydroxydisilane.

7. The surface modifier of claim 1, further comprising: an organoalkoxysilane represented by the following formula 2:

$$R^3Si(OR^2)_3 \quad \text{[Formula 2]}$$

wherein $R^2$ is a $C_{1-6}$ alkyl group; and $R^3$ is 3-(glycidoxy)propyl, 2-(3,4-epoxycyclohexyl)ethyl, 3,3,3-trifluoropropyl, 3-[3-(triethoxysilyl)propyltetrathio]propyl, 3-[3(trimethoxysilyl)propyltetrathio]propyl, 3-[3-(triethoxysilyl)propyldithio]propyl, 3-[3-(trimethoxysilyl)propyldithio]propyl, 3-aminopropyl, N-(2-aminoethyl)-3-aminopropyl, 3-acryloxypropyl, 3-methacryloxypropyl, 2-cyanoethyl, 3-cyanopropyl, 3-isocyanatopropyl, 3-mercaptopropyl, 3-(methacryloxy)propyl, $CF_3(CF_2)_nCH_2CH_2$, wherein n is an integer from 0 to 10, 2-(3-hexenyl)ethyl, or a terminal alkenyl group.

8. The surface modifier of claim 7, wherein the organoalkoxysilane represented by the formula 2 is selected from the group consisting of 3-glycidoxypropyltriethoxysilane, 3-glycidoxypropyltrimethoxysilane, 2-(3,4-epoxycyclohexyl)ethyltriethoxysilane, 2-(3,4-epoxycyclohexyl)ethyltrimethoxysilane, 3,3,3-trifluoropropyltriethoxysilane, 3,3,3-trifluoropropyltrimethoxysilane, 3-aminopropyltriethoxysilane, 3-aminopropyltrimethoxysilane, N-(2-aminoethyl)-3-aminopropyltrimethoxysilane, N-(2-aminoethyl)-3-aminopropyltriethoxysilane, 3-acryloxypropyltrimethoxysilane, 3-acryloxypropyltriethoxysilane, 3-(methacryloxy)propyltriethoxysilane, 3-(methacryloxy)propyltrimethoxysilane, 2-cyanoethyltriethoxysilane, 2-cyanoethyltrimethoxysilane, 3-cyanopropyltriethoxysilane, 3-cyanopropyltrimethoxysilane, 3-isocyanatopropyltriethoxysilane, 3-isocyanatopropyltrimethoxysilane, 3-mercaptopropyltriethoxysilane, 3-mercaptopropyltrimethoxysilane, $CF_3(CF_2)_nCH_2CH_2$—$Si(OCH_2CH_3)_3$, $CF_3(CF_2)_nCH_2CH_2$—$Si(OCH_3)_3$, 2-(3-hexenyl)ethyltriethoxysilane, and 2-(3-hexenyl)ethyltrimethoxysilane.

9. The surface modifier of claim 1, further comprising an aqueous acetic acid solution.

10. A surface modified metal oxide powder comprising:
a plurality of metal oxide particles; and
an organotetrahydroxydisilane covalently attached to the metal oxide particles, the organotetrahydroxydisilane represented by the following formula 1:

$$RR^1Si(OH)_2 \quad \text{[Formula 1]}$$

wherein R is selected from among cyclopentyl, cyclohexanyl, cyclopenten-1-yl, cyclopenten-2-yl, cyclopenten-3-yl, cyclohexen-1-yl, cyclohexen-2-yl, cyclohexen-3-yl, 3-methyl-cyclohexen-3-yl, 4-methyl-cyclohexen-3-yl, and 3,4-dimethylcyclohexen-3-yl, and $R^1$ is an SiR(OH)$_2$ group.

11. The surface modified metal oxide powder of claim 10, wherein the organotetrahydroxydisilane represented by formula 1 is selected from among 1,2-dicyclohexyl-1,1,2,2-tetrahydroxydisilane, 1,2-bis(cyclohexen-3-yl)-1,1,2,2-tetrahydroxydisilane, 1,2-bis(3-methyl-cyclohexen-3-yl)-1,1,2,2-tetrahydroxydisilane, 1,2-bis(4-methyl-cyclohexen-3-yl)1,1,2,2-tetrahydroxydisilane, and 1,2-bis(3,4-dimethylcyclohexen-3-yl)-1,1,2,2-tetrahydroxydisilane.

12. The surface modifier of claim 10, further comprising: an organoalkoxysilane represented by the following formula 2:

$$R^3Si(OR^2)_3 \quad \text{[Formula 2]}$$

wherein $R^2$ is a $C_{1-6}$ alkyl group; and $R^3$ is 3-(glycidoxy)propyl, 2-(3,4-epoxycyclohexyl)ethyl, 3,3,3-trifluoropropyl, 3-[3-(triethoxysilyl)propyltetrathio]propyl, 3-[3(trimethoxysilyl)propyltetrathio]propyl, 3-[3-(triethoxysilyl)propyldithio]propyl, 3-[3-(trimethoxysilyl)propyldithio]propyl, 3-aminopropyl, N-(2-aminoethyl)-3-aminopropyl, 3-acryloxypropyl, 3-methacryloxypropyl, 2-cyanoethyl, 3-cyanopropyl, 3-isocyanatopropyl, 3-mercaptopropyl, 3-(methacryloxy)propyl, $CF_3(CF_2)_nCH_2CH_2$, wherein n is an integer from 0 to 10, 2-(3-hexenyl)ethyl, or a terminal alkenyl group.

13. The surface modified metal oxide powder of claim 12, wherein the organoalkoxysilane represented by the formula 2 is selected from 3-glycidoxypropyltriethoxysilane, 3-glycidoxypropyltrimethoxysilane, 2-(3,4-epoxycyclohexyl)ethyltriethoxysilane, 2-(3,4-epoxycyclohexyl)ethyltrimethoxysilane, 3,3,3-trifluoropropyltriethoxysilane, 3,3,3-trifluoropropyltrimethoxysilane, 3-aminopropyltriethoxysilane, 3-aminopropyltrimethoxysilane, N-(2-aminoethyl)-3-aminopropyltrimethoxysilane, N-(2-aminoethyl)-3-aminopropyltriethoxysilane, 3-acryloxypropyltrimethoxysilane, 3-acryloxypropyltriethoxysilane, 3-(methacryloxy)propyltriethoxysilane, 3-(methacryloxy)propyltrimethoxysilane, 2-cyanoethyltriethoxysilane, 2-cyanoethyltrimethoxysilane, 3-cyanopropyltriethoxysilane, 3-cyanopropyltrimethoxysilane, 3-isocyanatopropyltriethoxysilane, 3-isocyanatopropyltrimethoxysilane, 3-mercaptopropyltriethoxysilane, 3-mercaptopropyltrimethoxysilane, $CF_3(CF_2)_nCH_2CH_2$—$Si(OCH_2CH_3)_3$, $CF_3(CF_2)_nCH_2CH_2$—$Si(OCH_3)_3$, 2-(3-hexenyl)ethyltriethoxysilane, and 2-(3-hexenyl)ethyltrimethoxysilane, wherein n is an integer from 0 to 10.

14. The surface modified metal oxide powder of claim 12, wherein the metal oxide particles are selected from the group consisting of silica, mica, talc, titanium oxide, zirconium oxide, tin oxide, iron oxide and zinc oxide and have particle diameters between 5 nm and 100 μm.

15. The surface modified metal oxide powder of claim 12, wherein the organotetrahydroxydisilane represented by the formula 1 is in an amount of 0.1-30 wt % based on the weight of the metal oxide particles.

16. The surface modified metal oxide powder of claim 10, further comprising an organosilanetriol attached to the metal oxide particles, wherein the organosilanetriol is selected from among cyclopentylsilanetriol, cyclohexanylsilanetriol, cyclopenten-1-ylsilanetriol, cyclopenten-2-ylsilanetriol, cyclopenten-3-ylsilanetriol, cyclohexen-1-ylsilanetriol, cyclohexen-2-ylsilanetriol, cyclohexen-3-ylsilanetriol, 3-methyl-cyclohexen-3-ylsilanetriol, 4-methyl-cyclohexen-3-ylsilanetriol, and 3,4-dimethyl-cyclohexen-3-ylsilanetriol.

17. The surface modified metal oxide powder of claim 16, wherein
the metal oxide particles comprise silica,
the organotetrahydroxydisilane comprises 1,2-dicyclopentyl-1,1,2,2-tetrahydroxydisilane; and
the organosilanetriol comprises cyclopentylsilanetriol.

* * * * *